Aug. 22, 1944.   R. PFLOCK   2,356,530
APPARATUS FOR THE ABSORPTION OF GASES IN LIQUIDS
Filed Nov. 15, 1941
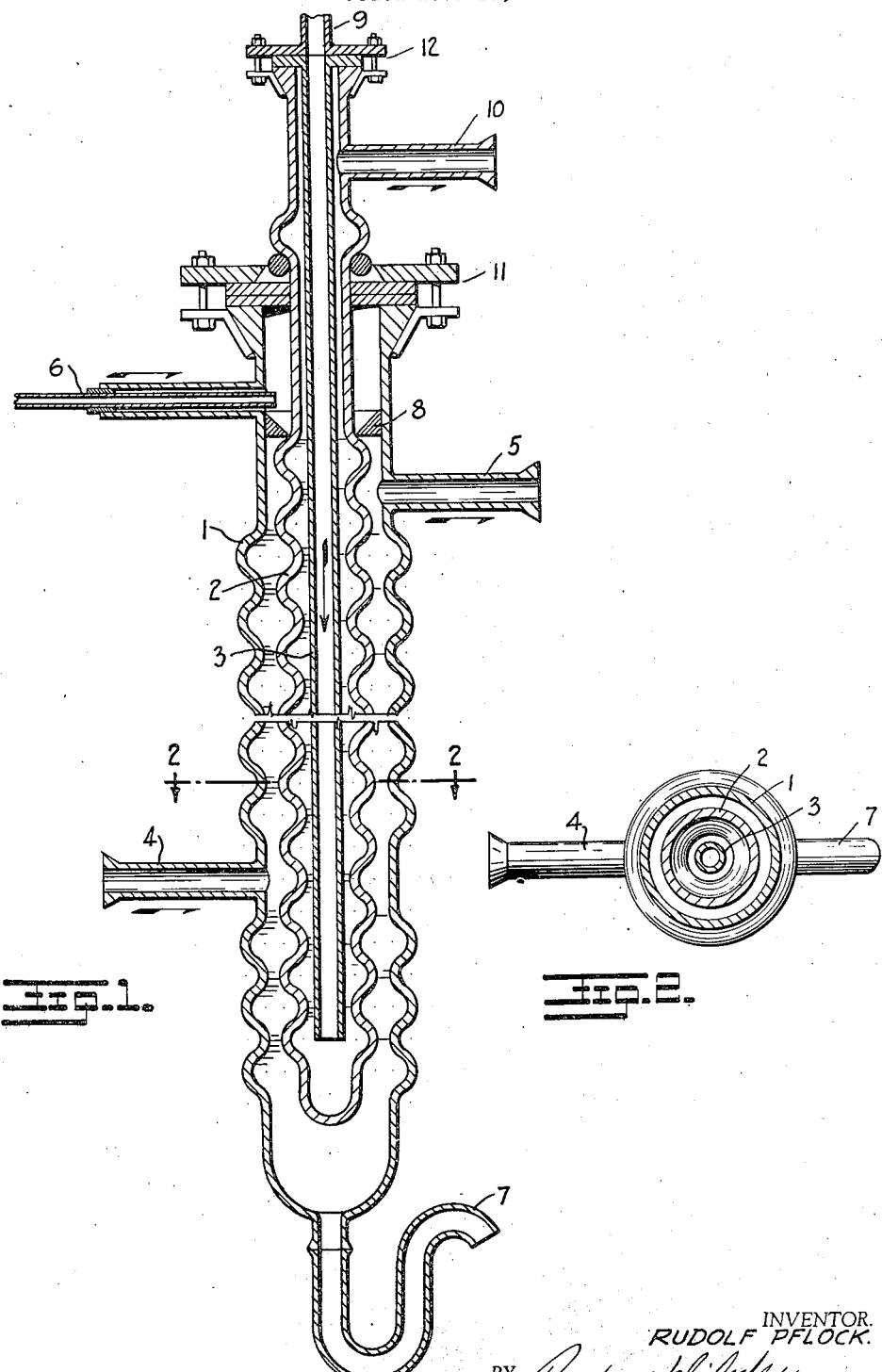
INVENTOR.
RUDOLF PFLOCK.
BY
ATTORNEY.

Patented Aug. 22, 1944

2,356,530

UNITED STATES PATENT OFFICE 2,356,530

APPARATUS FOR THE ABSORPTION OF GASES IN LIQUIDS

Rudolf Pflock, Nunchritz, near Grossenhain, Germany; vested in the Alien Property Custodian Application November 15, 1941, Serial No. 419,235
In Germany June 26, 1940

5 Claims. (Cl. 261—11)

My invention relates to an apparteus for absorbing gases in liquids, and in particular it also relates to the absorption of gases in liquids, wherein heat is developed by the absorption.

Heretofore, the absorption of gases in liquids was effected in towers or pipes charged with filling material, in absorption systems with cellarius vessels and similar devices. Such apparatus generally have considerable deficiencies. Above all, the distribution of gas and liquid is difficult in apparatus of a larger diameter, since the liquids are known to have a tendency of trickling down along the walls of the absorption towers. Also the cooling of such apparatus is difficult and only to be effected by a large amount of cooling water. Consequently, relatively large systems of apparatus were required heretofore. The efficiency of such systems was small when compared with their dimension. This happened especially, when gases had to be dealt with, which were diluted with large quantities of foreign gases, for instance in the case of the absorption of hydrochloric acid gas diluted with plenty of hydrogen or other gases.

The packing of such apparatus was relatively difficult, the number of the different places of packing mostly being quite large. This had an especially unfavourable effect when dealing with gases which corrode the packing material. In high towers of absorption charged with filling material, there were also great resistances disturbing the passage of the gas through the apparatus.

All these difficulties are overcome by my invention. The apparatus I have found, essentially consists of two parts which may easily be packed. It allows a thorough contact between the gas and the absorption liquid. The gas passes easily through the apparatus I have designed, and there are no such resistances to be met with as in towers charged with filling material. Absorption heat liable to occur, may easily be eliminated by cooling. The apparatus is quite small compared to its efficiency. The room needed for it is very small and the expenses for fitting it up are very low. On account of its simplicity it can be made from the most varying material, especially also from material which is cheap and may be easily supplied, for instance it may be made from glass. An apparatus according to the present invention is illustrated by the accompanying drawing. This drawing is only meant to illustrate the scope of my invention. Details may be changed of course in different ways without departing from my invention. In Figure 1, the drawing shows a longitudinal section, Figure 2 a cross section of the absorption apparatus. The latter section is taken at a level and seen in a direction identified by the numeral 2, dot-dash lines and arrows in Fig. 1.

The apparatus consists of an undulated pipe 2, which is put in an outer jacket pipe 1 by means of a packing or grinding. A seal 11 illustrates the former in the embodiment of the drawing. Pipe 1 is shown to have, similar to pipe 2, a wall undulated by substantially transverse corrugations, the two walls subdividing the space therebetween into a row of annular chambers. The pipe 2 is closed at the bottom; it has a distributor 8 in its upper part. This may have the shape of a hopper forming a ring around pipe 2. By a feeding pipe 6, the absorption liquid is supplied and uniformly distributed by the hopper so as to trickle down the surface of pipe 2. It collects at the bottom of pipe 1 which has an opening at its lowest point. This opening is closed by a suitable water seal or, as indicated in the drawing, by a socalled swan neck or trap 7. Near the lower end of the jacket pipe 1 there is a side pipe 4 by which the gases to be absorbed are introduced. Near the upper end of the jacket pipe 1 there is a pipe 5 through which the gases leave. For eliminating the absorption heat, a pipe 9 is sealed at 12 onto and extends down to the bottom of the inner pipe 2 and is used for supplying a cooling liquid, e. g. water, or only a cooling gas, e. g. air. The cooling liquid or gas ascends inside the pipe 2 and leaves by the socket 10.

The corrugations of the substantially concentric pipes 1 and 2 are shown to be arranged at a similar lead or pitch, but are relatively axially displaced for half that lead or pitch. By thus registering the restrictions of pipe 1 with the bulbous enlargements of pipe 2, and conversely registering the enlargements of the former with constrictions of the latter, I show an example for attaining one of the objects of this invention, according to which there is to be an alternate acceleration and slowing up of the gas flow. This is one mode of effecting a predetermined whirling movement of the gases, by which every single particle of the gas is always brought again in contact with the surface of the liquid. This increases the efficiency of the apparatus essentially. The wave-like outer pipe 1 may be surrounded entirely or partly by a cooling device for removing part of the reaction-heat at the outer surface of the apparatus.

In following the absorption of a gas by a liquid by means of the apparatus I have invented, shall be illustrated by the absorption of hydrochloric acid gas in water, though any other gas and any other liquid may be used too; for instance carbonic acid, sulphurous acid, ammonia gas, gases containing chlorine or bromine and many other gas-like products may be absorbed or caused to react in liquids. As liquids, water or aqueous solutions of acids, bases or salts, also organic liquids like alcohols, ketones, esters or hydrocarbons etc. may be used.

The absorption of hydrogen chloride from gases containing the same by means of water in my apparatus takes place in the following way:

The gas containing hydrogen chloride is introduced into the apparatus through pipe 4. Here it ascends and leaves the apparatus through pipe 5. At the same time, water is introduced into the apparatus through pipe 6; it distributes on the plate or ring 8 and trickles down along the outer surface of pipe 2; (it may also partly trickle along the inner surface of pipe 1). Thus, an intimate contact is effected between the gas and the liquid. The water gets more and more saturated with hydrogen chloride and finally collects at the bottom of pipe 1, where it may flow off through the swan neck 7, which also shuts off the apparatus. Since much heat is developed by the absorption of the hydrogen chloride in the water, water is led through the pipe 9; this water distributes at the bottom of pipe 2 and rises until it leaves by the pipe 10. By means of a cock not shown in the drawing, the amount of water introduced through 6 is regulated so as to allow the best possible cooling and consequently a sufficient absorption of the gas. The pipe 4 may be fixed quite near the bottom of the apparatus. Then however, it is difficult to make the aqueous hydrochloric acid formed leave the apparatus sufficiently cold. Therefore it is suitable as I have found, to place the socket 4 somewhat higher up. Thus, the hydrochloric acid formed is further cooled before leaving the apparatus, without getting in contact with fresh gas.

The supply of gas is regulated so, that practically all hydrogen chloride is absorbed. However, the flow of gas may also be kept up as strong as to allow only part of the hydrogen chloride to be absorbed. For complete absorption, the gas leaving through 5 is then led to a second apparatus of the same type, adding more such apparatus if wanted. But even then, considering the small diameter and the efficiency of my apparatus, the needed space is very small when compared with the generally known apparatus of absorption, likewise the prime cost is very low. The construction of each single apparatus being very plain, even a larger set composed of several single elements requires only little attendance and supervision.

What I claim is:

1. Apparatus for the absorption of a gas by a liquid, comprising a substantially cylindrical core having relatively spaced, circular projections, a jacket surrounding said core and having constrictions substantially registering with said projections, said projections and constrictions subdividing the space between the core and the jacket into a row of annular chambers communicating by way of slots, an inlet for absorption liquid communicating with the space between the core and jacket, an outlet for absorption liquid communicating with the space between the core and jacket and in opposed relation to said inlet, and a similarly opposed inlet and outlet for gas opening into opposite ends of said space as compared to the inlet and outlet for absorption liquid.

2. Apparatus for the absorption of gas by a liquid, comprising walls predeterminedly spaced apart near their upper and lower ends but repeatedly extending into close proximity with each other at spaced levels intermediate said ends, the space between certain of said walls serving as absorption chamber said walls also forming an inner container, and an intake and an outlet for a cooling liquid opening onto said inner container at a low level and at a high level, respectively.

3. Apparatus for the absorption of a gas by a liquid, comprising walls predeterminedly spaced apart near their upper and lower ends but repeatedly extending into close proximity with each other at spaced levels intermediate said ends, the space between said walls serving as absorption chamber, an intake for the absorption liquid near the upper end of the absorption chamber, and a distributor substantially closing the upper portion of the chamber, into which opens said intake, relatively to the rest of the chamber and serving to control the absorption liquid, so that said liquid slowly and evenly descends over the said walls where they face said chamber.

4. Apparatus for the absorption of a gas by a liquid, comprising an outer container and an inner container sealedly depending into said outer container, the space between said containers serving as absorption chamber, the sides of said containers repeatedly extending into close proximity with each other at vertically spaced levels, an intake for the absorption liquid near a distributor substantially closing the upper portion of the chamber, into which opens said intake, relatively to the rest of the chamber and serving to control the absorption liquid, so that said liquid slowly and evenly descends over the said inner container only.

5. Apparatus for absorbing gas by a liquid and having two units each comprising walls predeterminedly spaced apart near their upper and lower ends but repeatedly extending into close proximity with each other at spaced levels intermediate said ends, the space between said walls serving as absorption chamber, the chamber of each unit having a gas intake intermediate a pair of said spaced level of close proximity of the walls, and the intake of the chamber of one unit being connected at a high point of the chamber of the other unit.

RUDOLF PFLOCK.